United States Patent
Oh et al.

(10) Patent No.: US 11,078,853 B2
(45) Date of Patent: Aug. 3, 2021

(54) MIXED FUEL AMOUNT CONTROL SYSTEM APPLYING ACTIVE PURGING

(71) Applicants: HYUNDAI MOTOR COMPANY, Seoul (KR); KIA MOTORS CORPORATION, Seoul (KR)

(72) Inventors: Young-Kyu Oh, Gwacheon-si (KR); Keum-Jin Park, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 96 days.

(21) Appl. No.: 16/676,771

(22) Filed: Nov. 7, 2019

(65) Prior Publication Data

US 2020/0182173 A1    Jun. 11, 2020

(30) Foreign Application Priority Data

Dec. 10, 2018 (KR) .................. 10-2018-0158355

(51) Int. Cl.
| | |
|---|---|
| *F02D 41/00* | (2006.01) |
| *F02M 21/02* | (2006.01) |
| *F02M 25/08* | (2006.01) |

(52) U.S. Cl.
CPC ..... *F02D 41/0042* (2013.01); *F02M 21/0215* (2013.01); *F02M 25/0836* (2013.01)

(58) Field of Classification Search
CPC ............. F02D 41/0042; F02D 41/1454; F02D 41/0032; F02D 41/401; F02D 41/402; F02D 2041/001; F02M 25/0836; Y02T 10/40
See application file for complete search history.

(56) References Cited

U.S. PATENT DOCUMENTS

| | | | | |
|---|---|---|---|---|
| 10,655,570 | B1 * | 5/2020 | Sager | F02D 41/003 |
| 2015/0308361 | A1 * | 10/2015 | Hibira | F02D 19/061 |
| | | | | 123/674 |
| 2016/0153385 | A1 * | 6/2016 | Pursifull | F02M 63/0285 |
| | | | | 123/299 |
| 2017/0260931 | A1 * | 9/2017 | Guidi | F02M 26/43 |
| 2017/0342918 | A1 * | 11/2017 | Sager | F02M 25/0854 |
| 2018/0372030 | A1 * | 12/2018 | Achleitner | F02D 41/0002 |
| 2019/0113007 | A1 * | 4/2019 | Kato | F02D 41/0045 |
| 2019/0211760 | A1 * | 7/2019 | Choi | F02D 41/0032 |
| 2020/0003163 | A1 * | 1/2020 | Niemeyer | F02D 41/1459 |
| 2020/0063671 | A1 * | 2/2020 | Asanuma | B60K 6/46 |
| 2020/0149485 | A1 * | 5/2020 | Asanuma | F02D 41/0045 |
| 2020/0166008 | A1 * | 5/2020 | Asanuma | B60K 15/03504 |

FOREIGN PATENT DOCUMENTS

KR    10-0812423 B    3/2008

* cited by examiner

*Primary Examiner* — Phutthiwat Wongwian
*Assistant Examiner* — Sherman D Manley
(74) *Attorney, Agent, or Firm* — Brinks Gilson & Lione

(57) ABSTRACT

A mixed fuel amount control system applying active purging includes: a fuel tank in which biofuel and fossil fuel are mixed and stored, an active purging device to supply an evaporated gas evaporated in the fuel tank to an intake pipe, and a concentration sensor to sense a mixing ratio of the biofuel stored in the fuel tank changes. In particular, the flow rate and the concentration of the evaporated gas of the fuel tank flowing into the intake pipe are changed according to a mixing ratio of biofuel and fossil fuel.

9 Claims, 6 Drawing Sheets

MIXED FUEL AMOUNT CONTROL SYSTEM APPLYING ACTIVE PURGING

CROSS-REFERENCE TO RELATED APPLICATION

This application claims priority to and the benefit of Korean Patent Application No. 10-2018-0158355, filed on Dec. 10, 2018, the entire contents of which are incorporated herein by reference.

FIELD

The present disclosure relates to a mixed fuel amount control system applying active purging.

BACKGROUND

The statements in this section merely provide background information related to the present disclosure and may not constitute prior art.

Bioethanol is produced by fermenting and refining plant resources such as sugar cane or corn. The bioethanol has ingredient content different from synthetic ethanol produced from petroleum resources. There is growing interest in bioethanol due to depletion of fossil fuel, obligation of reducing green gas, deepening of instability of the energy market, etc.

The bioethanol fuel used in a vehicle is being distributed to the automotive fuel market with pure bioethanol or bioethanol mixed with gasoline.

When the bioethanol fuel contains 10% bioethanol, E10 is marked on a container containing the bioethanol fuel. When the bioethanol is 100%, E100 is marked on the container containing the bioethanol fuel.

Regardless of a mixing ratio of gasoline and bioethanol, a flexible fuel vehicle (FFV) driven by the bioethanol fuel is spreading. The FFV is produced to be used from the gasoline to the E100 as fuel without restrictions.

Meanwhile, the evaporated gas is generated in the fuel tank according to the changes in pressure and temperature. When the evaporated gas generated in the fuel tank accumulates, the fuel tank is likely to be broken or the evaporated gas is likely to be leaked into the atmosphere. When the evaporated gas is leaked from the fuel tank, the atmosphere is contaminated.

After the evaporated gas is absorbed on the activated carbon contained in a canister, the evaporated gas is treated by injecting the evaporated gas absorbed on the activated carbon into an intake pipe to combust it in a combustion chamber.

However, we have discovered that since the FFV is driven regardless of a mixing ratio of biofuel and fossil fuel, the bioethanol fuels having different mixing ratios from each other are highly, likely to be mixed in the fuel tank. Therefore, the composition of the bioethanol fuel supplied to the combustion chamber changes momentarily.

We have also found that when the uniform concentration and amount of evaporated gas are supplied to the intake pipe at the time of the evaporated gas treatment, there is a high possibility that the exhaust gas of a lean or rich air-fuel ratio is generated. In some cases, the concentration of the harmful components contained in the exhaust gas may also be generated highly.

SUMMARY

The present disclosure provides a mixed fuel amount control system applying active purging, which can control the concentration and the flow rate of the evaporated gas injected into an intake pipe according to a mixing ratio of biofuel and fossil fuel, thereby inhibiting or preventing deterioration of combustion characteristics of an engine, and reducing or minimizing occurrence of harmful components at the time of the evaporated gas treatment.

In one form of the present disclosure, a mixed fuel amount control system applying active purging includes: a fuel tank in which first fuel and second fuel are mixed and stored, an active purging device for compressing and supplying the evaporated gas evaporated in the fuel tank to an intake pipe, and a concentration sensor for sensing a mixing ratio of the first fuel stored in the fuel tank, and concentration and a flow rate of the evaporated gas supplied to the intake pipe are changed according to the mixing ratio sensed by the concentration sensor.

In addition, the active purging device can include a canister connected to the fuel tank to absorb the evaporated gas, a purge line for connecting the fuel tank, the canister, and the intake pipe, a purge pump mounted on the purge line, a purge valve mounted on the purge line to be interposed between the purge pump and the intake pipe, a first pressure sensor mounted on the purge line to be interposed between the purge pump and the purge valve, and a second pressure sensor mounted on the purge line to be interposed between the canister and the purge pump, and the concentration and the flow rate of the evaporated gas supplied to the intake pipe by the active purging device can be changed by adjusting the RPM (revolutions per minute) of the purge pump and an opening amount of the purge valve.

In addition, the mixed fuel amount control system applying active purging can further include an engine for receiving an intake air from the intake pipe, and an exhaust pipe for exhausting the combusted gas of the engine, and the exhaust pipe can be mounted with a lambda sensor for measuring the amount of oxygen of the combusted gas, and the amount of oxygen measured by the lambda sensor can be utilized based on the adjustment of the concentration and the flow rate of the evaporated gas supplied to the intake pipe by the active purging device.

In addition, a cam valve timing, a fuel injection amount, a fuel injection time point, and an ignition time point can be changed based on the mixing ratio sensed by the concentration sensor and the amount of oxygen measured by the lambda sensor.

In addition, the mixed fuel can selectively be injected once, twice, or three times during an intake stroke or a compression stroke according to a traveling state of a vehicle; when the mixed fuel is injected once during the intake or compression stroke, the injection time point can be advanced, and the injection period can be lengthened as the mixing ratio of the first fuel can be higher than a previous mixing ratio of the first fuel; when the mixed fuel is injected twice during the intake or compression stroke, the injection time point of a primary injection can be advanced, the injection period of the primary injection can be lengthened, and an injection ending time point of a secondary injection can be delayed as the mixing ratio of the first fuel is higher than the previous mixing ratio of the first fuel; and when the mixed fuel is injected three times during the intake or compression stroke, the injection time point of the primary injection can be advanced, the injection period of the primary injection can be lengthened, the injection time point of the secondary injection can be advanced, the injection period of the secondary injection can be lengthened, and the injection ending time point of a tertiary injection can be delayed as the mixing ratio of the first fuel is higher than the previous mixing ratio of the first fuel.

In addition, when the mixing ratio sensed by the concentration sensor is 0, the fuel injection can be performed twice during one rotation of a crankshaft when the engine rotates at the RPM of a low speed range or a medium speed range and the torque equal to or greater than an appropriate value is required, the fuel injection can be performed once during one rotation of the crankshaft when the torque smaller than the appropriate value is required during the rotation of the engine, and the required torque can be calculated based on the RPM and a vehicle speed of the engine.

In addition, when the mixing ratio sensed by the concentration sensor is 1, the fuel injection can be performed three times during one rotation of the crankshaft when the engine rotates at the RPM of the low speed range and the torque equal to or greater than the appropriate value is required; the fuel injection can be performed twice during one rotation of the crankshaft when the engine rotates at the RPM of the medium speed range and the torque equal to or greater than the appropriate value is required; and the fuel injection can be performed once during one rotation of the crankshaft when the engine rotates and the torque smaller than the appropriate value is required.

In addition, as the mixing ratio sensed by the concentration sensor increases from 0 to 1, while the engine rotates at the RPM of the low speed range, the number of injection times is increased during one rotation of the crankshaft and the torque requiring three times injection is gradually decreased.

In addition, the purge pump can selectively be operated at 15000, 30000, 45000, and 6000 RPM, and the purge valve can operatively be controlled to have the opening amounts of 100%, 70%, 50%, 30%, and 0%.

In addition, the first fuel may be biofuel, and the second fuel may be fossil fuel.

According to the mixed fuel amount control system applying active purging in one form of the present disclosure as described above, it is possible to control the concentration and the flow rate of the evaporated gas injected into the intake pipe according to the mixing ratio of first fuel and second fuel, thereby preventing deterioration of combustion characteristics of the engine, and reducing or minimizing occurrence of harmful components at the time of the evaporated gas treatment.

In addition, it is possible to change the fuel injection timing from at least once to at most three times considering the RPM and the required torque of the engine, thereby inducing the mixing of fuel and intake air suitable for the traveling state.

In addition, it is possible to delay or advance the fuel injection timing considering the RPM and the required torque of the engine, thereby inducing the mixing of fuel and intake air suitable for the traveling state.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
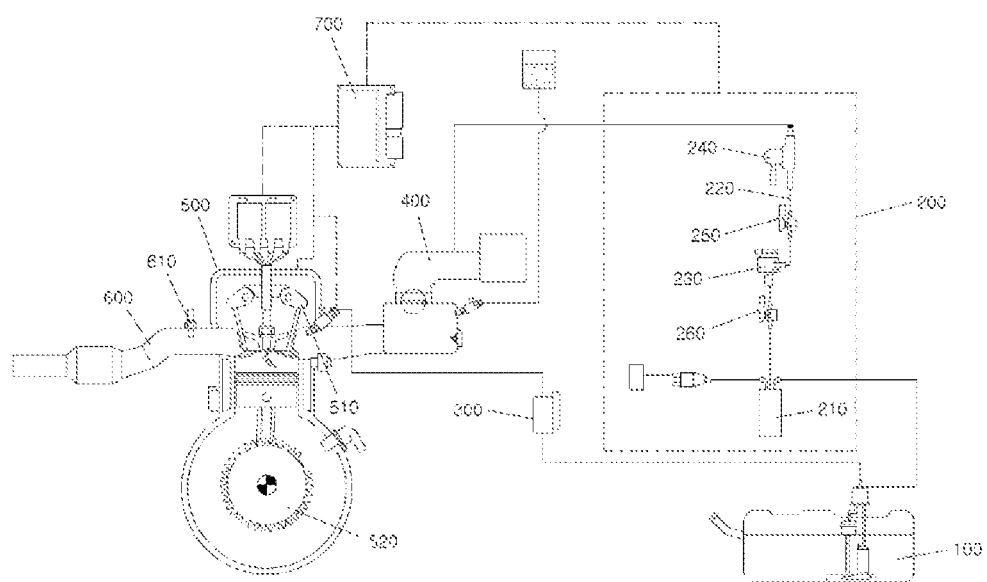
FIG. 1 is an exemplary diagram illustrating a mixed fuel amount control system applying active purging in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a mixed fuel amount control system applying active purging in form of the present disclosure will be described with reference to the accompanying drawings.

As illustrated in FIGS. 1 to 7, a mixed fuel amount control system applying active purging, as one form of the present disclosure, includes: a fuel tank 100 in which first fuel and second fuel are mixed and stored, an active purging device 200 for supplying the evaporated gas evaporated in the fuel tank 100 to an intake pipe 400, a concentration sensor 300 for sensing a mixing ratio of the first fuel stored in the fuel tank 100, an engine 500 for receiving an intake air from the intake pipe 400, and an exhaust pipe 600 for exhausting the combusted gas of the engine 500, and the concentration and the flow rate of the evaporated gas supplied to the intake pipe 400 are changed according to a mixing ratio sensed by the concentration sensor 300. In the example the first fuel is biofuel, and the second fuel is fossil fuel.

Bioethanol fuel is injected into the fuel tank 100 regardless of the mixing ratio thereof. Therefore, the bioethanol fuels having different compositions from each other are mixed in the fuel tank 100, and as a result, the bioethanol fuel stored in the fuel tank 100 has the composition different from that of the injected fuels.

The concentration sensor 300 senses a mixing ratio of the fuel supplied from the fuel tank 100 to the combustion chamber. The concentration sensor 300 is mounted on a line for connecting the fuel tank 100 and an injection nozzle. The concentration sensor 300 senses the mixing ratio of the fuel, and transmits a generated signal to a control unit. A control unit 700 controls an operation of the active purging device 200 and the fuel injection nozzle.

The active purging device 200 includes a canister 210 connected to the fuel tank 100 to absorb the evaporated gas, a purge line 220 for connecting the fuel tank 100, the canister 210, and the intake pipe 400, a purge pump 230 mounted on the purge line 220, a purge valve 240 mounted on the purge line 220 to be interposed between the purge pump 230 and the intake pipe 400, a first pressure sensor 250 mounted on the purge line 220 to be interposed between the purge pump 230 and the purge valve 240, and a second pressure sensor 260 mounted on the purge line 220 to be interposed between the canister 210 and the purge pump 230.

The concentration and the flow rate of the evaporated gas supplied to the intake pipe 400 by the active purging device 200 are changed by adjusting the RPM of the purge pump 230 and the opening amount of the purge valve 240 by the control unit 700.

The purge pump 230 is selectively operated at any one RPM of predetermined 15000, 30000, 45000, and 60000 RPMs in order to satisfy the pre-calculated concentration and flow rate of the evaporated gas. The purge valve 240 is operated to have predetermined opening amounts of 100%, 70%, 50%, 30%, and 0% in order to satisfy the concentration and the flow rate of the evaporated gas.

The exhaust pipe 600 is mounted with a lambda sensor 610 for measuring the amount of oxygen of the combusted gas. The oxygen concentration sensed by the lambda sensor 610 is provided to the control unit 700 as a signal. The control unit 700 utilizes the signal received from the lambda sensor 610 based on the adjustment of the concentration and the flow rate of the evaporated gas supplied to the intake pipe 400 by the active purging device 200.

The control unit 700 changes the timing of a cam valve 510, the adjustment of the flow rate and the concentration of the evaporated gas by the active purging device 200, the fuel injection amount, the fuel injection time point, and the ignition time point based on the mixing ratio sensed by the concentration sensor 300 and the oxygen concentration sensed by the lambda sensor 610.

The control unit 700 can advance the fuel injection time point as the mixing ratio sensed by the concentration sensor 300 is higher, and can delay the fuel injection time point as the mixing ratio sensed by the concentration sensor 300 is lower.

The control unit 700 can increase the opening period of the intake valve as the concentration of oxygen sensed by the lambda sensor 610 is lower, and can decrease the opening period of the intake valve as the concentration of oxygen sensed by the lambda sensor 610 is higher.

In addition, the control unit 700 decreases the flow rate of the evaporated gas or the concentration of the evaporated gas by the active purging device 200, and decreases the fuel injection amount as the concentration of oxygen sensed by the lambda sensor 610 is lower. The control unit 700 can increase the flow rate of the evaporated gas or increase the concentration of the evaporated gas by the active purging device 200, and can increase the fuel injection amount as the concentration of oxygen sensed by the lambda sensor 610 is higher.

FIGS. 2 to 7 are diagrams illustrating an example of delaying or advancing the fuel injection time point by the control unit 700 based on the mixing ratio sensed by the concentration sensor 300. As illustrated in FIGS. 2 to 6, the control unit 700 in one form of the present disclosure injects the vehicle fuel once or injects it twice or three times as multi-injection considering the RPM and the required torque of the engine 500 at the time of vehicle traveling, when the mixing ratio sensed by the concentration sensor 300 is 0 to 1. It is assumed that the RPM of the engine 500 is a low speed in the range of 0 to 3000 rpm, a medium speed in the range of 3001 to 6000 rpm, and a high speed in the range of 6001 to 9000 rpm or more. The required torque is determined by calculating from a predetermined braking mean effective pressure bmep and the displacement of the engine 500. The appropriate or desired value of the required torque described below is changed according to the mixing ratio of biofuel and fossil fuel.

Figure 2:
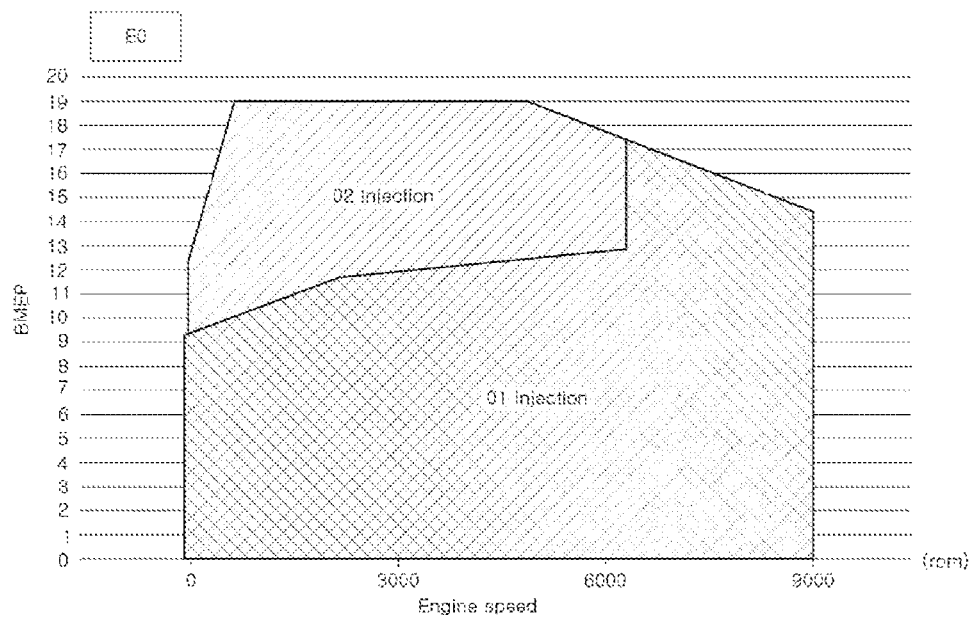
FIGS. 2 to 6 are exemplary diagrams illustrating the number of fuel injection times for each mixing ratio of the mixed fuel amount control system applying active purging of FIG. 1.
Figure 3:
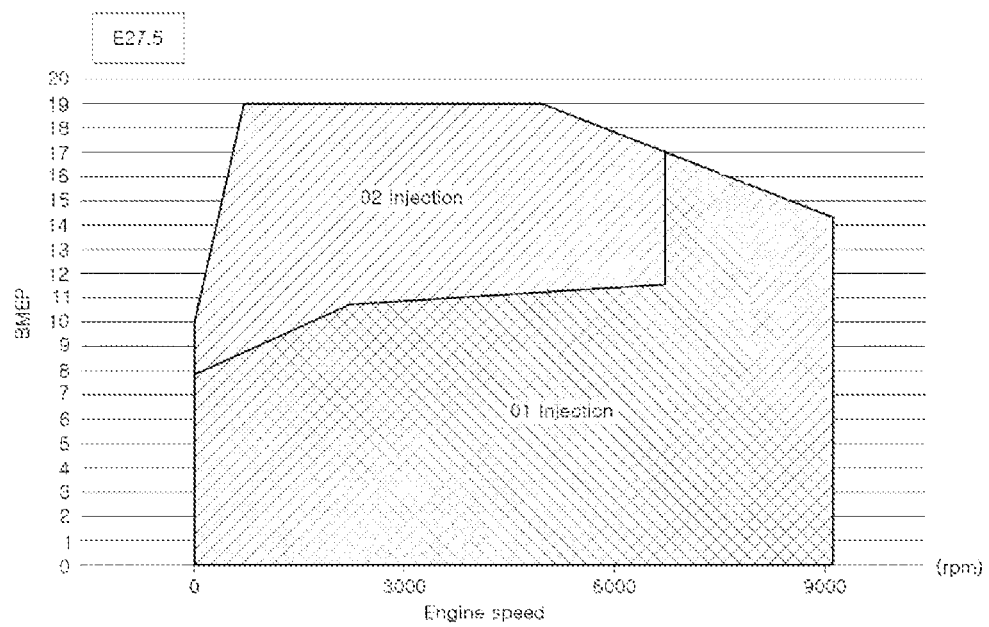

As illustrated in FIGS. 2 and 3, when the mixing ratio sensed by the concentration sensor 300 is from 0 to 0.275, the control unit 700 generates the fuel injection twice during one rotation of a crankshaft 520 when the engine 500 rotates at the RPM of the low speed range and the medium speed range and the torque of the appropriate value or more is required. The control unit 700 generates the fuel injection once during one rotation of the crankshaft 520 when the torque smaller than the appropriate value during the rotation of the engine is required.

Figure 4:
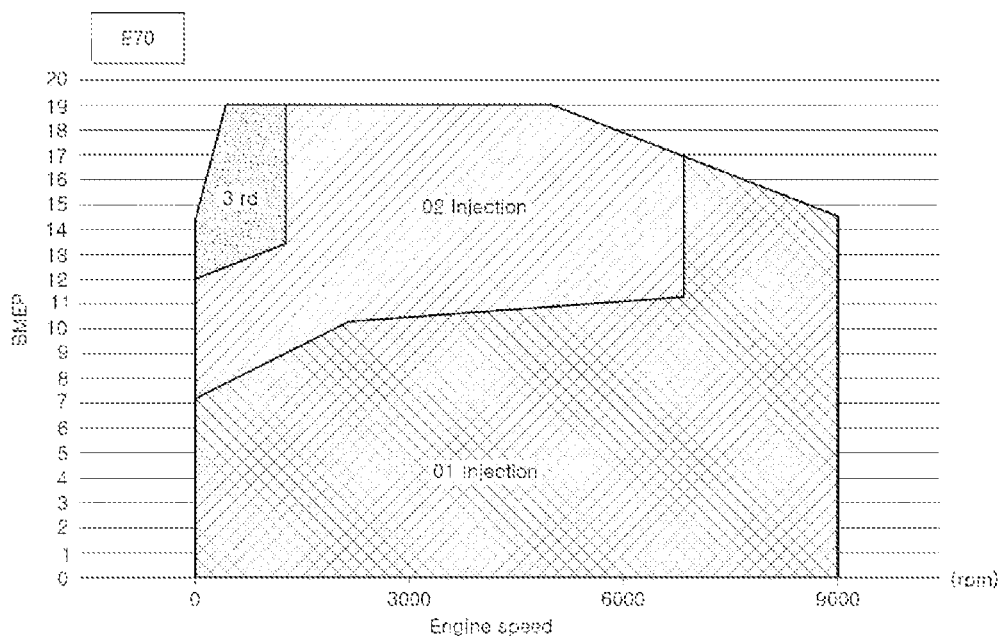
Figure 5:
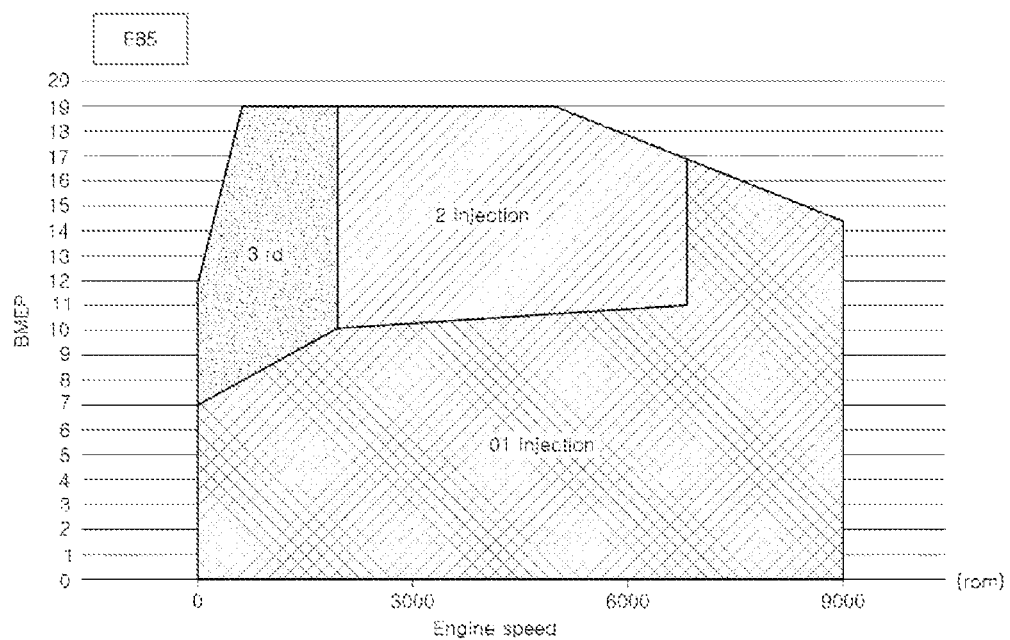
Figure 6:
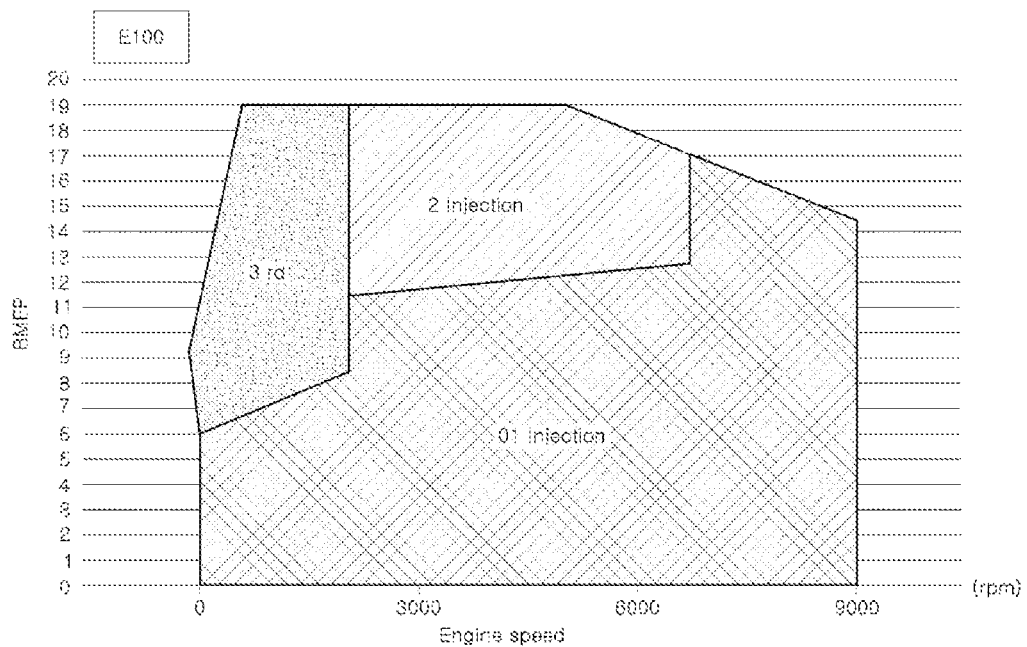

As illustrated in FIGS. 4 to 6, when the mixing ratio sensed by the concentration sensor 300 is from 0.7 to 1, the control unit 700 generates the fuel injection three times during one rotation of the crankshaft 520 when the engine 500 rotates at the RPM of the low speed range and the torque of the appropriate value or more is required. The control unit 700 generates the fuel injection twice during one rotation of the crankshaft 520 when the engine 500 rotates at the RPM of the medium speed range and the torque of the appropriate value or more is required. The control unit 700 generates the fuel injection once during one rotation of the crankshaft 520 when the engine 500 rotates at the RPM of the high speed range and the torque of the appropriate value or more is required. The control unit 700 generates the fuel injection once during one rotation of the crankshaft 520 when the engine 500 rotates and the torque smaller than the appropriate value is required.

As illustrated in FIG. 4, when the mixing ratio sensed by the concentration sensor 300 is 0.7, the control unit 700 generates the fuel injection twice during one rotation of the crankshaft 520 when the engine 500 rotates at the RPM of the low speed range and the torque smaller than the appropriate value and equal to or greater than any value is required. The control unit 700 generates the fuel injection once during one rotation of the crankshaft 520 when the engine 500 rotates at the RPM of the low speed range and the torque smaller than any value is required.

Figure 7:
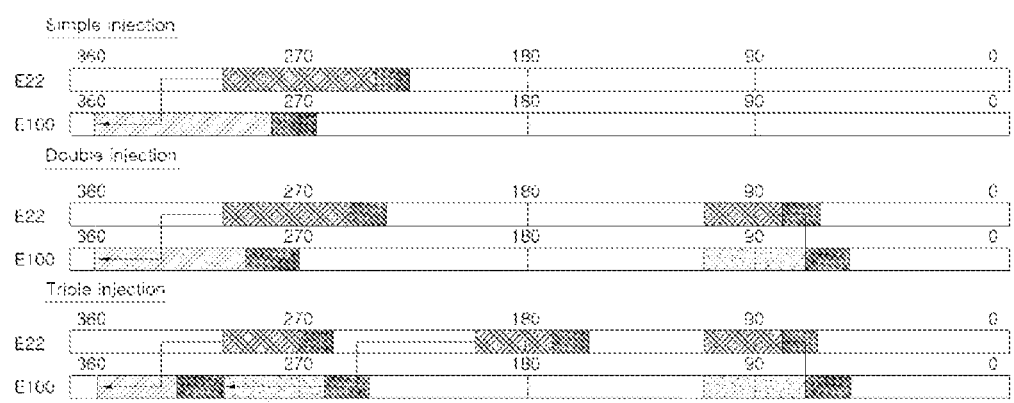
FIG. 7 is an exemplary diagram illustrating the fuel injection timing for each mixing ratio of the mixed fuel amount control system applying active purging of FIG. 1.

As illustrated in FIG. 7, the control unit 700 injects the fuel while the rotational angle of the crankshaft 520 of the engine 500 changes from 310 degrees to 225 degrees when the fuel is injected once. When the fuel is injected twice, the control unit 700 injects the fuel primarily while the rotational angle of the crankshaft 520 of the engine 500 changes from 120 degrees to 70 degrees, and injects the fuel secondarily while the rotational angle of the crankshaft 520 changes from 310 degrees to 230 degrees. When the fuel is injected three times, the control unit 700 injects the fuel primarily while the rotational angle of the crankshaft 520 of the engine 500 changes from 120 degrees to 70 degrees, injects the fuel secondarily while the rotational angle of the crankshaft 520 changes from 200 degrees to 160 degrees, and injects the fuel tertiarily while the rotational angle of the crankshaft 520 changes from 310 degrees to 250 degrees.

The control unit 700 gradually advances the fuel injection generated when the rotational angle of the crankshaft 520 of the engine 500 is between 315 degrees and 225 degrees as the mixing ratio sensed by the concentration sensor 300 approaches from 0.22 to 1. Finally, when the mixing ratio becomes 1, the fuel injection generated when the rotational angle of the crankshaft 520 is between 315 degrees and 225 degrees is generated when the rotational angle of the crankshaft 520 is between 350 degrees and 260 degrees.

The control unit 700 gradually advances the fuel injection generated when the rotational angle of the crankshaft 520 of the engine 500 is between 220 degrees and 160 degrees as the mixing ratio sensed by the concentration sensor 300 approaches from 0.22 to 1. Finally, when the mixing ratio becomes 1, the fuel injection generated when the rotational angle of the crankshaft 520 is between 220 degrees and 160 degrees is generated when the rotational angle of the crankshaft 520 is between 330 degrees and 250 degrees.

The control unit 700 gradually advances the injection ending time point of the fuel injection generated when the rotational angle of the crankshaft 520 of the engine 500 is between 120 degrees and 70 degrees as the mixing ratio sensed by the concentration sensor 300 approaches from 0.22 to 1. Finally, when the mixing ratio becomes 1, the fuel injection generated when the rotational angle of the crankshaft 520 is between 120 degrees and 70 degrees is generated when the rotational angle of the crankshaft 520 is between 120 degrees and 60 degrees.

According to the intake and exhaust system for the vehicle in which the biofuel as described above is used to be mixed, it is possible to control the concentration and the flow rate of the evaporated gas injected into the intake pipe 400 according the mixing ratio of biofuel and fossil fuel, thereby inhibiting or preventing deterioration of the fuel characteristics of the engine 500, and reducing or minimizing occurrence of the harmful components at the time of the evaporated gas treatment.

In addition, it is possible to change the fuel injection timing from at least once to at most three times considering the RPM and the desired torque of the engine 500, thereby inducing the mixing of fuel and intake air suitable for the traveling state.

In addition, it is possible to delay or advance the fuel injection timing considering the RPM and the desired torque of the engine 500, thereby inducing the mixing of fuel and intake air suitable for the traveling state.

What is claimed is:

1. A mixed fuel amount control system applying active purging, the mixed fuel amount control system comprising:
   a fuel tank in which first fuel and second fuel are mixed and stored;
   an active purging device configured to supply an evaporated gas evaporated in the fuel tank to an intake pipe; and
   a concentration sensor configured to sense a mixing ratio of the first fuel stored in the fuel tank,
   wherein a concentration and a flow rate of the evaporated gas supplied to the intake pipe are changed based on the mixing ratio sensed by the concentration sensor,
   wherein the active purging device comprises:
      a canister connected to the fuel tank and configured to absorb the evaporated gas;
      a purge line for connecting the fuel tank, the canister, and the intake pipe;
      a purge pump mounted on the purge line;
      a purge valve mounted on the purge line to be interposed between the purge pump and the intake pipe;
      a first pressure sensor mounted on the purge line to be interposed between the purge pump and the purge valve; and
      a second pressure sensor mounted on the purge line to be interposed between the canister and the purge pump, and
   wherein the concentration and the flow rate of the evaporated gas supplied to the intake pipe by the active purging device are changed by adjusting revolutions per minutes (RPM) of the purge pump and an opening amount of the purge valve.

2. The mixed fuel amount control system of claim 1, further comprising:
   an engine for receiving an intake air from the intake pipe; and
   an exhaust pipe for exhausting a combusted gas of the engine,
   wherein the exhaust pipe is mounted with a lambda sensor configured to measure an amount of oxygen of the combusted gas, and
   wherein the amount of oxygen measured by the lambda sensor is utilized based on an adjustment of the concentration and the flow rate of the evaporated gas supplied to the intake pipe by the active purging device.

3. The mixed fuel amount control system of claim 2, wherein a cam valve timing, a fuel injection amount, a fuel injection time point, and an ignition time point are changed based on the mixing ratio sensed by the concentration sensor and the amount of oxygen measured by the lambda sensor.

4. The mixed fuel amount control system of claim 2, wherein the mixed fuel is selectively injected once, twice, or three times during an intake stroke or a compression stroke based on a traveling state of a vehicle,
   wherein when the mixed fuel is injected once during the intake or compression stroke, an injection time point is advanced, and an injection period is lengthened as the mixing ratio of the first fuel is higher than a previous mixing ratio of the first fuel,
   wherein when the mixed fuel is injected twice during the intake or compression stroke, the injection time point of a primary injection is advanced, the injection period of the primary injection is lengthened, and an injection ending time point of a secondary injection is delayed as the mixing ratio of the first fuel is higher than the previous mixing ratio of the first fuel, and
   wherein when the mixed fuel is injected three times during the intake or compression stroke, the injection time point of the primary injection is advanced, the injection period of the primary injection is lengthened, an injection time point of the secondary injection is advanced, an injection period of the secondary injection is lengthened, and an injection ending time point of a tertiary injection is delayed as the mixing ratio of the first fuel is higher than the previous mixing ratio of the first fuel.

5. The mixed fuel amount control system of claim 4, wherein when the mixing ratio sensed by the concentration sensor is zero (0),
   a fuel injection is performed twice during one rotation of a crankshaft when the engine rotates at a RPM of a low speed range or a medium speed range and a torque equal to or greater than an appropriate value is required,
   the fuel injection is performed once during one rotation of the crankshaft when the torque smaller than the appropriate value during the rotation of the engine is required, and
   the required torque is calculated based on the RPM and a vehicle speed of the engine.

6. The mixed fuel amount control system of claim 5, wherein when the mixing ratio sensed by the concentration sensor is 1,
   the fuel injection is performed three times during one rotation of the crankshaft when the engine rotates at the RPM of the low speed range and the torque equal to or greater than the appropriate value is required,
   the fuel injection is performed twice during one rotation of the crankshaft when the engine rotates at the RPM of the medium speed range and the torque equal to or greater than the appropriate value is required, and the fuel injection is performed once during one rotation of the crankshaft when the engine rotates and the torque smaller than the appropriate value is required.

7. The mixed fuel amount control system of claim 6, wherein as the mixing ratio sensed by the concentration sensor increases from 0 to 1, while the engine rotates at the RPM of the low speed range, the number of injection times is increased during one rotation of the crankshaft and the torque requiring three times of injection is gradually decreased.

8. The mixed fuel amount control system of claim 1, wherein the purge pump is selectively operated approximately at 15000, 30000, 45000, and 6000 RPM, and wherein the purge valve is operatively controlled to have the opening amounts of 100%, 70%, 50%, 30%, and 0%.

9. The mixed fuel amount control system of claim 1, wherein the first fuel is biofuel, and wherein the second fuel is fossil fuel.

\* \* \* \* \*